C. J. YATES.
COMMUTATOR TYPE HIGH SPEED DYNAMO ELECTRIC MACHINE.
APPLICATION FILED OCT. 31, 1906.

922,230.

Patented May 18, 1909.

Witnesses
Oliver W. Sharman
Victor E. Jullien

Inventor
Charles J. Yates
By
Chas. E. Lord
Attorney

UNITED STATES PATENT OFFICE.

CHARLES J. YATES, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

COMMUTATOR-TYPE HIGH-SPEED DYNAMO-ELECTRIC MACHINE.

No. 922,230.     Specification of Letters Patent.     Patented May 18, 1909.

Application filed October 31, 1906. Serial No. 341,405.

*To all whom it may concern:*

Be it known that I, CHARLES J. YATES, a citizen of the United States, residing at Norwood, in the county of Hamilton and State of Ohio, have invented certain new and useful Improvements in Commutator-Type High-Speed Dynamo-Electric Machines, of which the following is a full, clear, and exact specification.

My invention relates to dynamo-electric machines and particularly to high speed machines of the direct-current type such as direct current turbo-generators.

It has been proposed to surround the portions of the coils, which extend beyond the core of a rotor, by heavy rings or bands to prevent their displacement at high speeds of rotation. It is necessary that some means be provided for supporting and centering the rings and for preventing a movement or displacement thereof axially of the machine. Heretofore considerable difficulty has been experienced in direct current machines in providing adequate supporting and protecting means for the coils at the commutator end of the armature, for the reason that the commutator necks or leads connecting the coils to the commutator have rendered difficult a proper supporting of coil retaining rings.

The main object of my invention is to provide an armature for high speed machines in which all the parts projecting beyond the core, particularly at the commutator end of the machine, such as the ends of the coils and the commutator leads or necks, are well protected and so firmly held in position that there is no danger of displacement or relative movement of said parts at high speeds of rotation.

A further object is to provide an armature for high speed machines which is simple in construction, strong and compact.

My invention consists in certain novel details of construction and combinations and arrangements of parts described in the specification and set forth in the appended claims.

For a better understanding of my invention, reference is had to the accompanying drawings in which—

Figure 1:
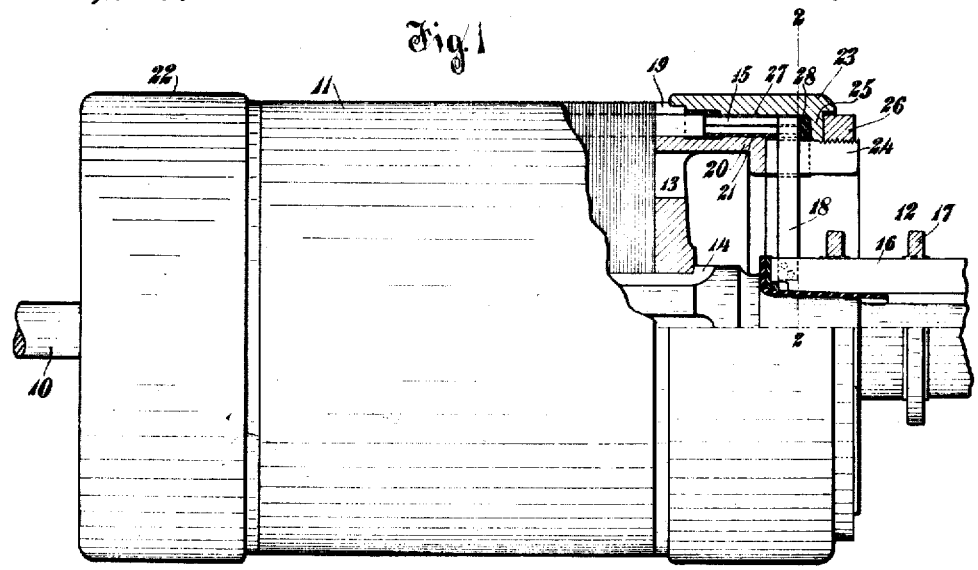
Figure 2:
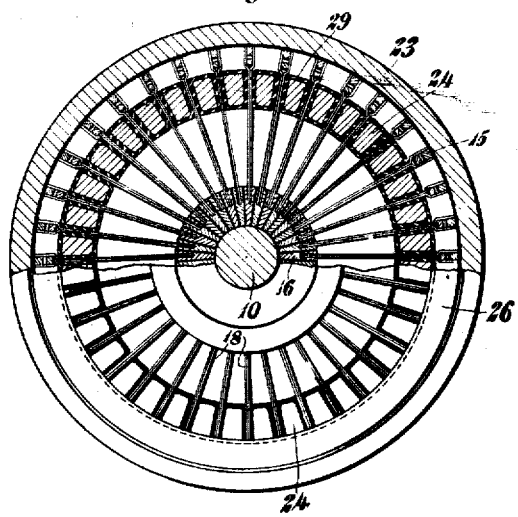

Figure 1 is an elevation of an armature equipped with my invention, parts being in section and broken away; and Fig. 2 is an end view of the same, parts being in section and broken away, the section being taken approximately along the line 2—2 of Fig. 1.

Referring now to the figures of the drawing, I have shown at 10 a shaft on which is mounted the armature core 11 and commutator 12. The core consists of laminæ held between end-members, one of which is shown at 13. The portion of the shaft surrounded by the core is enlarged and is provided with longitudinal ventilating slots or flutes 14 extending beyond the end-members 13 and communicating with the transverse air-ducts or openings in the core. The core is slotted and carries an armature winding 15 which projects beyond the ends of the core. The commutator 12 consists of bars 15 which are held securely in position by shrink-rings 17. The armature coils and commutator bars are connected together by radial commutator leads or necks 18 which are preferably soldered to the coils, and riveted to the commutator bars.

As my invention relates to the protecting and supporting means of the commutator end of the machine, this part of the machine only is shown in detail. The end-member 13 is provided with a slotted flange 19 through which the coils extend and with an annular bracket or flange 20, in this case having an outer surface which is cylindrical. If desired however, the outer surface of the flange may be conical. The portions of the coils 15 projecting beyond the commutator end of the core are supported by this annular flange, being separated therefrom by insulation 21. It is to be understood that the coils of the opposite end of the machine extend outward from the core and are supported by an end member in a similar manner. In order that the projecting portions of the coils may not be displaced at high speeds I surround the coils by end-rings 22 and 23. As was stated before the supporting and centering of the ring at the commutator end of the machine has heretofore been a very difficult matter on account of the commutator necks or leads. In this case it is accomplished in the following manner. The annular flange 20 is preferably thicker at the outer end than at the inner and is slotted inwardly for a considerable distance from the end thereof, thereby forming long outwardly projecting teeth or fingers 24. The commutator necks or leads 18 extend radially through the slots between the fingers 24, the fingers extending a considerable distance outward beyond the commutator leads or necks. The ring 23 engages a shoulder portion of the slotted flange 19 of the end-member and is provided at its outer end with a flange 25 which extends inwardly over the commutator necks and rests upon the teeth or fingers 24. It is thus seen that the ring is supported and centered both at the inner and outer ends thereof.

The end-ring 23 is retained in position and prevented from moving axially by a nut 26 which engages the outer ends of the fingers which are threaded externally, and bears against a notched or recessed portion of the inwardly extending flange 25 of the ring.

The ring 23 is separated from the coils 15 and commutator leads 18 by insulation 27 and 28. The commutator leads fit tightly between the fingers or teeth 24 and are separated therefrom by insulation 29 which is preferably wrapped around the teeth or fingers as is shown in the drawings. Thus, these teeth or fingers serve to space apart and to hold the commutator leads or necks in position. If desired, however, the insulation may surround the leads or necks 18. The depth of the slotted portion of the shoulder or bracket may be made as great as desired so as to provide a sufficient bracing means for the commutator necks or leads. I do not wish to be confined to an end member serving both as a support for the ends of the coils and as a supporting and spacing device for the commutator necks or leads, as it may in some cases be employed for the latter purpose independently of the former. It is seen that the coils and commutator necks or leads are held firmly in place and that there can be no accidental movement of the protecting ring 23. Furthermore the structure is compact and consists of few parts.

I do not wish to be confined to the exact details shown as changes or modifications can be made without departing from the spirit and scope of my invention.

What I claim as new and desire to secure by Letters Patent is:—

1. In a dynamo-electric machine, an armature comprising a core and an end clamping member having an outwardly extending flange, coils carried by said core and having projecting portions resting on said flange, a commutator, leads connecting said coils and commutator, and an end-ring surrounding said projecting portions of the coils and resting on said flange.

2. In a dynamo-electric machine, an armature comprising a core and coils, a bracket having an annular surface, portions of said coils projecting beyond the core and resting on the bracket, a commutator, commutator leads or conductors extending through said bracket, and an end-ring surrounding the projecting portions of the coils and supported by said bracket.

3. In a dynamo-electric machine, an armature comprising a core and coils, a bracket having a cylindrical or annular surface, and slotted at its outer end, portions of said coils projecting beyond the core and resting on the bracket, a commutator, commutator leads or conductors extending through the slots of said bracket, and an end-ring surrounding the projecting portions of the coils and supported by said bracket.

4. An armature comprising a core, and an end-member having an annular bracket, coils carried by said core and having portions resting on said bracket, commutator-leads secured to said coils, said bracket having fingers or teeth extending between and beyond said commutator leads, and an end-ring surrounding said projecting portions of the coils and resting on said fingers or teeth.

5. In a dynamo-electric machine, an armature comprising a core and coils, a bracket having an annular surface, portions of said coils projecting beyond the core and resting on the bracket, an end-ring surrounding the coils, a commutator, commutator leads or conductors extending through said bracket and a nut on said bracket and engaging the end-ring.

6. An armature comprising a core and an end-member having a cylindrical bracket, coils carried by said core and having portions resting on said bracket, commutator-leads secured to said coils, said bracket having fingers or teeth extending between and beyond said commutator leads, an end-ring surrounding said projecting portions of the coils and resting on said fingers and teeth, and means for retaining said end-ring in position comprising a nut on said fingers or teeth and engaging said end-ring.

7. In an armature of a dynamo-electric machine, a core and end-member, said end-member having a flange having open ended slots at its outer end, coils carried by said core and resting on said flange, and commutator leads extending through the slots of said flange.

8. In an armature of a dynamo-electric machine, a core, an end-member, having an annular bracket, said bracket being slotted at its outer end forming teeth or fingers, each of said teeth or fingers being surrounded with insulation, coils carried by said core and having projecting portions resting on said bracket, and commutator leads connected to said coils and extending inward between said insulated teeth or fingers.

9. In an armature of a dynamo-electric machine, a core and end-member, said end-member having an annular flange slotted at its outer end, coils carried by said core and resting on said flange, commutator leads extending through the slots of said annular flange, and means surrounding the projecting portions of said coils for retaining the latter in position.

10. An armature of a dynamo-electric machine comprising a core, an end-member, coils, a commutator, and commutator leads or necks connecting said coils and commutator, said end-member having at its outer end teeth or projections serving as spacing members for the commutator leads or necks.

11. In an armature for a dynamo-electric machine, a core, an end-member having a slotted portion forming teeth or fingers, coils carried by the core, a commutator, and commutator leads connected to said coils and commutator, said leads extending through the slots and spaced apart by the teeth.

In testimony whereof I affix my singature, in the presence of two witnesses.

CHARLES J. YATES.

Witnesses:
ARTHUR F. KWIS,
GEO. B. SCHLEY.

---

Correction in Letters Patent No. 922,230.

It is hereby certified that in Letters Patent No. 922,230, granted May 18, 1909, upon the application of Charles J. Yates, of Norwood, Ohio, for an improvement in "Commutator-Type High-Speed Dynamo-Electric Machines," an error appears in the printed specification requiring correction, as follows: In line 70, page 1, the reference-numeral "15" should read *16*; and that the said Letters Patent should be read with this correction therein that the same may conform to the record of the case in the Patent Office.

Signed and sealed this 15th day of June, A. D., 1909.

[SEAL.]

C. C. BILLINGS,
*Acting Commissioner of Patents.* tending through the slots of said annular flange, and means surrounding the projecting portions of said coils for retaining the latter in position.

10. An armature of a dynamo-electric machine comprising a core, an end-member, coils, a commutator, and commutator leads or necks connecting said coils and commutator, said end-member having at its outer end teeth or projections serving as spacing members for the commutator leads or necks.

11. In an armature for a dynamo-electric machine, a core, an end-member having a slotted portion forming teeth or fingers, coils carried by the core, a commutator, and commutator leads connected to said coils and commutator, said leads extending through the slots and spaced apart by the teeth.

In testimony whereof I affix my singature, in the presence of two witnesses.

CHARLES J. YATES.

Witnesses:
ARTHUR F. KWIS,
GEO. B. SCHLEY.

---

Correction in Letters Patent No. 922,230.

It is hereby certified that in Letters Patent No. 922,230, granted May 18, 1909, upon the application of Charles J. Yates, of Norwood, Ohio, for an improvement in "Commutator-Type High-Speed Dynamo-Electric Machines," an error appears in the printed specification requiring correction, as follows: In line 70, page 1, the reference-numeral "15" should read *16*; and that the said Letters Patent should be read with this correction therein that the same may conform to the record of the case in the Patent Office.

Signed and sealed this 15th day of June, A. D., 1909.

[SEAL.]

C. C. BILLINGS,
*Acting Commissioner of Patents.*